United States Patent Office 3,230,518
Patented Jan. 18, 1966

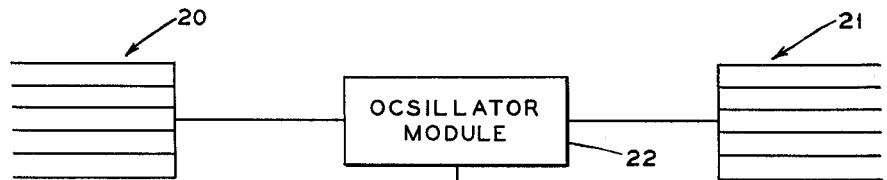
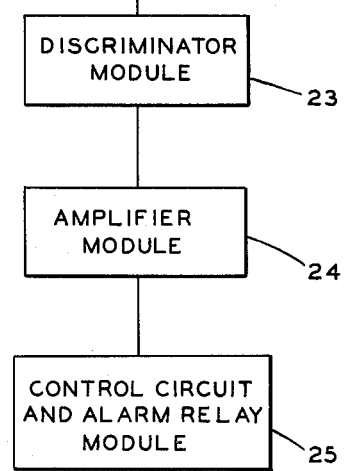
FIG.1
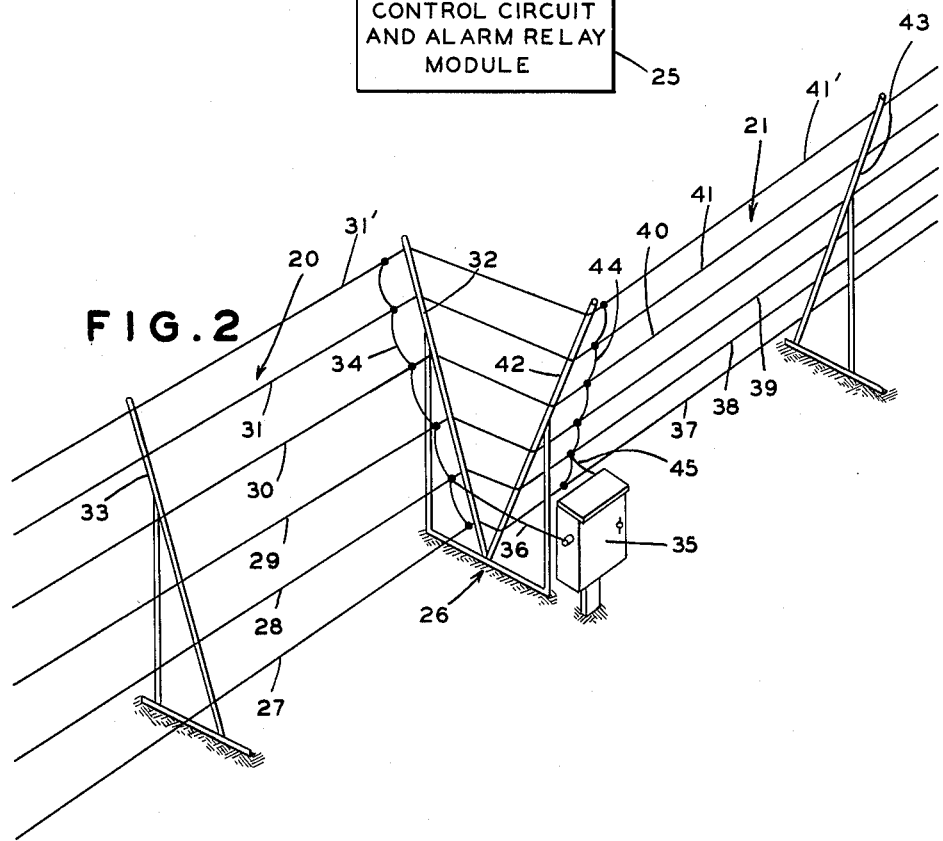
FIG.2

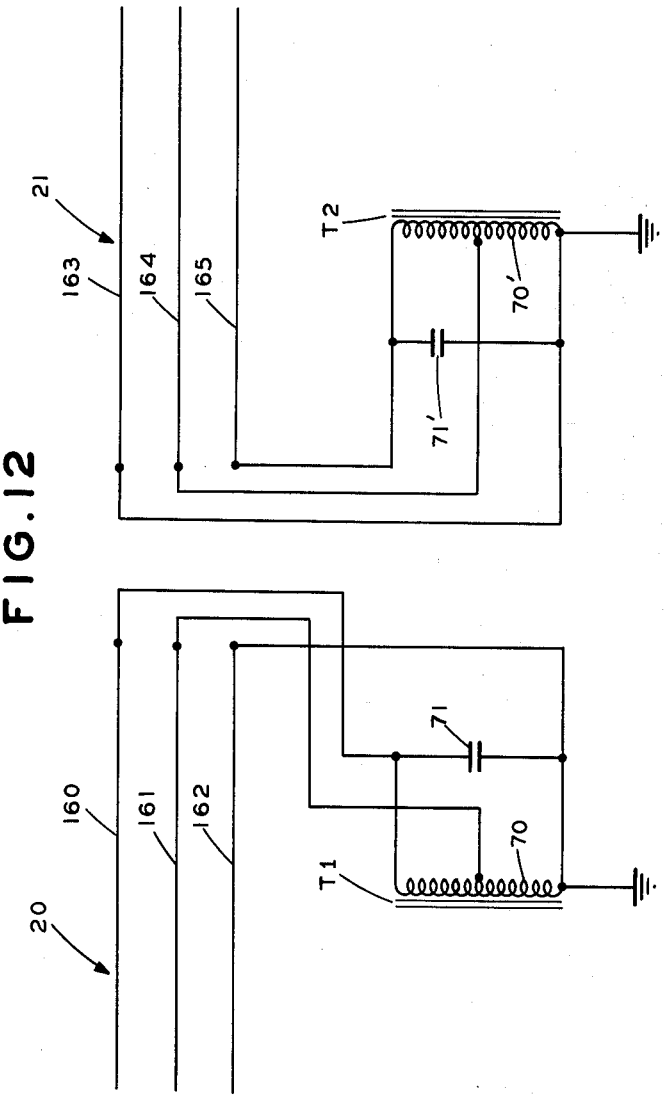

3,230,518
METHOD OF DETECTING INTRUDERS AND INTRUDER DETECTION APPARATUS OF THE CAPACITY-TYPE UTILIZING BALANCED ASYMMETRIC FIELDS
Theo N. Vassil, Flushing, and Peter Laakmann, Staten Island, N.Y., assignors to American District Telegraph Company, Jersey City, N.J., a corporation of New Jersey
Filed Mar. 20, 1961, Ser. No. 97,004
19 Claims. (Cl. 340—258)

The present invention relates to the protection of property and more particularly to the detection of intruders approaching a boundary.

The detection of intruders by means of so-called capacity fences has been widely used for a number of years, and various systems have been devised for this form of protection. Examples of such systems are described, for example, in United States Patent No. 2,421,771, which issued on June 10, 1947 to Browning, United States Patent No. 2,455,376, which issued Dec. 7, 1948 to Lindsay, and United States Patent No. 2,971,184, which issued on Feb. 7, 1961 to Pearson, McDonough and Vassil. Capacity fence systems are used principally for outdoor boundary protection of installations such as public utility plants, unattended power substations, water works, military bases, storage depots and the like.

Most capacity fence systems at the present time involve the use of two antenna arrays each formed from a plurality of horizontal wires disposed as a group in a vertical plane. In the system described in the aforementioned Pearson, McDonough and Vassil patent, each antenna array extends along the entire length of the boundary protected by the system. However, it has been found that present systems using two antennas extending in respective opposite directions along a boundary from a common point are vulnerable to a coordinated attack by two intruders. Thus highly skilled intruders have been able to defeat such capacity fences by taking advantage of the fact the effect on the system of one intruder approaching one antenna could be offset by another intruder approaching the other antenna, provided their movements were carefully and properly coordinated.

The present invention is directed to capacity fence protection systems, and the principal object of the invention has been to provide a novel and improved capacity fence system.

More particularly, it has been a principal object of the invention to provide a capacity fence system which is far more resistant to defeat than systems previously available and especially is more resistant to defeat by coordinated attack of two intruders. It cannot be said with assurance that any electrical protection system is completely proof against defeat. However, the present invention provides a system which has been found, for practical purposes, to be free from any substantial danger of a successful coordinated attack, and hence to afford a much greater degree of safety than systems previously available.

Another object of the invention has been to provide a capacity fence system which maintains a high level of stability under varying weather conditions, thus avoiding an undue incidence of spurious alarms.

Another object of the invention has been the provision of a capacity fence system which is resistant to the effect of lightning discharges and electrical storms.

Another important object of the invention has been the provision of a novel and improved antenna array for use in a capacity fence system. In particular, it has been an important object of the invention to provide such an array which will create an asymmetric field.

Another object of the invention has been to provide a novel and improved method of perimeter protection.

Other and further objects, features and advantages of the invention will appear more fully from the following description taken in connection with the appended drawings, in which:

FIG. 1 is a simplified block diagram illustrating the system of the invention;

FIG. 2 is a schematic illustration of a preferred form of antenna array in accordance with the invention;

FIG. 12 is a schematic diagram illustrating a modification of the invention.

*Simplified block diagram*

Figure 2A:
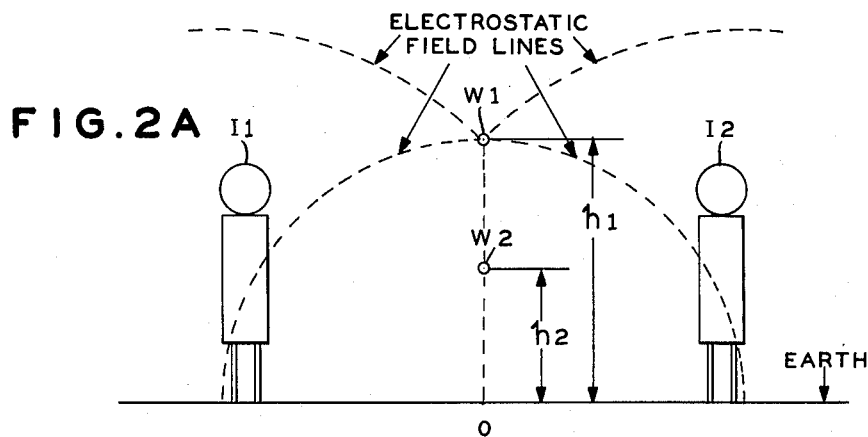
FIGS. 2A and 2B are diagrams illustrating certain principles of the invention.

Referring now to the drawings and more particularly to FIG. 1, the system of the invention comprises an antenna array 20, an antenna array 21, an oscillator module 22, a discriminator module 23, an amplifier module 24 and a control circuit and alarm relay module 25. The antenna arrays 20 and 21 each comprise a plurality of vertically spaced, parallel, horizontal conductors, the conductors of each array extending along the perimeter of the area to be protected in opposite directions from an intermediate point, generally the center of the perimeter. As will be discussed in detail hereinafter, the antenna arrays are constructed so that the electromagnetic fields produced around the arrays are asymmetric, i.e., the shape and extent of the field about the antenna 20 will be substantially different from that about the antenna 21.

The oscillator module 22 comprises two radio frequency oscillators each having its frequency determining circuit coupled to a respective antenna and tuned to provide slightly different frequencies, e.g., 28 kc. and 30 kc. The coupling between the respective corresponding oscillators and antennas is such that the generated frequency will be altered upon any variation in the capacity to ground of the corresponding antenna. The outputs of the two oscillators are combined to produce beat frequencies which are then filtered to reject all frequency components other than the difference frequency.

The difference frequency signal output of the oscillator module is supplied to the discriminator module 23, where a portion thereof is rectified to produce a D.C.

voltage which varies linearly with changes in the difference frequency. The D.C. output of the discriminator is differentiated, and the differentiated voltage may be termed the alarm signal. Another portion of the signal is passed through a rectifier and is then amplified to serve as a supervisory signal.

The alarm signal output of the discriminator module is amplified in the amplifier module 24 and the amplified signal is supplied to a differential relay in the alarm relay module, which operates on either high or low current to produce an alarm. The differential relay will also be operated by a failure in supervisory voltage thereby to signal equipment failure evidenced by a loss of supervisory voltage.

*Antenna construction*

Referring now to FIG. 2, there is shown a preferred form of antenna construction in accordance with the invention. In FIG. 2 the antenna 20 extends to the left of a central support 26, while the antenna 21 extends to the right thereof. In each case the antennas extend along the boundary being protected and follow the contours of the boundary. Antenna 20 comprises parallel conductors 27, 28, 29, 30, 31 and 31', which extend to the left from a support post 32 forming a part of the central support 26. The conductors 27-31' are each horizontal; by horizontal is meant generally parallel to the ground. The conductors 27-31' are supported at suitable intervals along their lengths by attachment to support posts, a first such post being shown at 33 in FIG. 2. The conductors 27-31 are insulated from the posts 26, 27, etc., as by being mounted on insulators, or as shown in FIG. 2D.

The conductors 27-31' are vertically spaced from each other; this spacing may be approximately even and the lowermost conductor should be relatively close to the ground, while the uppermost conductor should be at a height which could not conveniently be scaled by jumping. For example, the lowermost conductor might be 9 inches from the ground, while the uppermost conductor might be approximately 80 inches from the ground.

The support posts 32, 33, etc., for the antenna 20 are inclined at an angle from the vertical so that the conductors 27-31' lie in an inclined plane. It is preferable that the plane in which the conductors 27-31' lie be inclined from the vertical at an angle lying in the range of about 15 to 25°.

The conductors 27-31' are electrically connected together, as indicated by a conductor 34, and are connected to an output box 35 by a conductor 36. The box 35 may contain the oscillator and other system circuits, but in most cases these circuits will be located in some nearby structure within the protected area and the radio frequency power will be supplied to the box 35 by a cable (not shown).

Antenna 21 comprises parallel conductors 37, 38, 39, 40, 41 and 41', which extend toward the right from a support post 42 forming a part of central support 26. The left ends of conductors 37-41' extend from support post 42 to post 32, but are not connected to conductors 27-31' so that the antennas 20 and 21 are not connected together. The conductors 37-41' are supported at suitable intervals by posts such as the post 43. The posts 42, 43, etc., are disposed at an angle so that the conductors 37-41' lie in an inclined plane. The angle of this inclined plane with the vertical is preferably the same as that of the antenna 20, but in the opposite direction. The antennas 20 and 21 are thus identical except that one antenna lies in a plane tilted outwardly of the boundary, while the other antenna lies in a plane tilted inwardly of the boundary.

The conductors 37-41' are connected together, as by a conductor 44, and are supplied with radio frequency power from the box 35 by a conductor 45.

The lengths of antennas 20 and 21 are preferably about equal. The total length of boundary which can be protected properly with one system will vary depending on local conditions such as weather, undergrowth, prevalence of small animals, etc., but generally a total length of about 300 feet is a practical value at which adequate sensitivity and stability may be maintained. Since the system operates on the basis of changes in capacity to ground, it will sometimes be desirable to provide an improved ground, as by laying a metallic screen or mesh on the earth or other surface beneath the antennas.

Figure 2B:
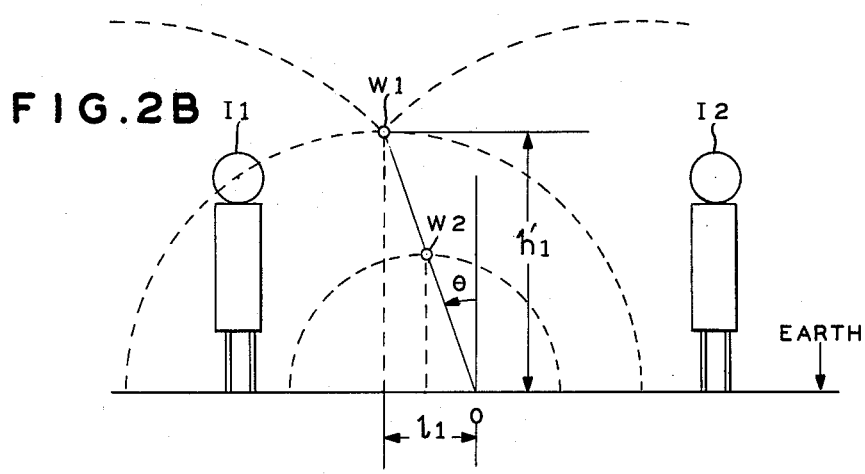
Figure 2C:
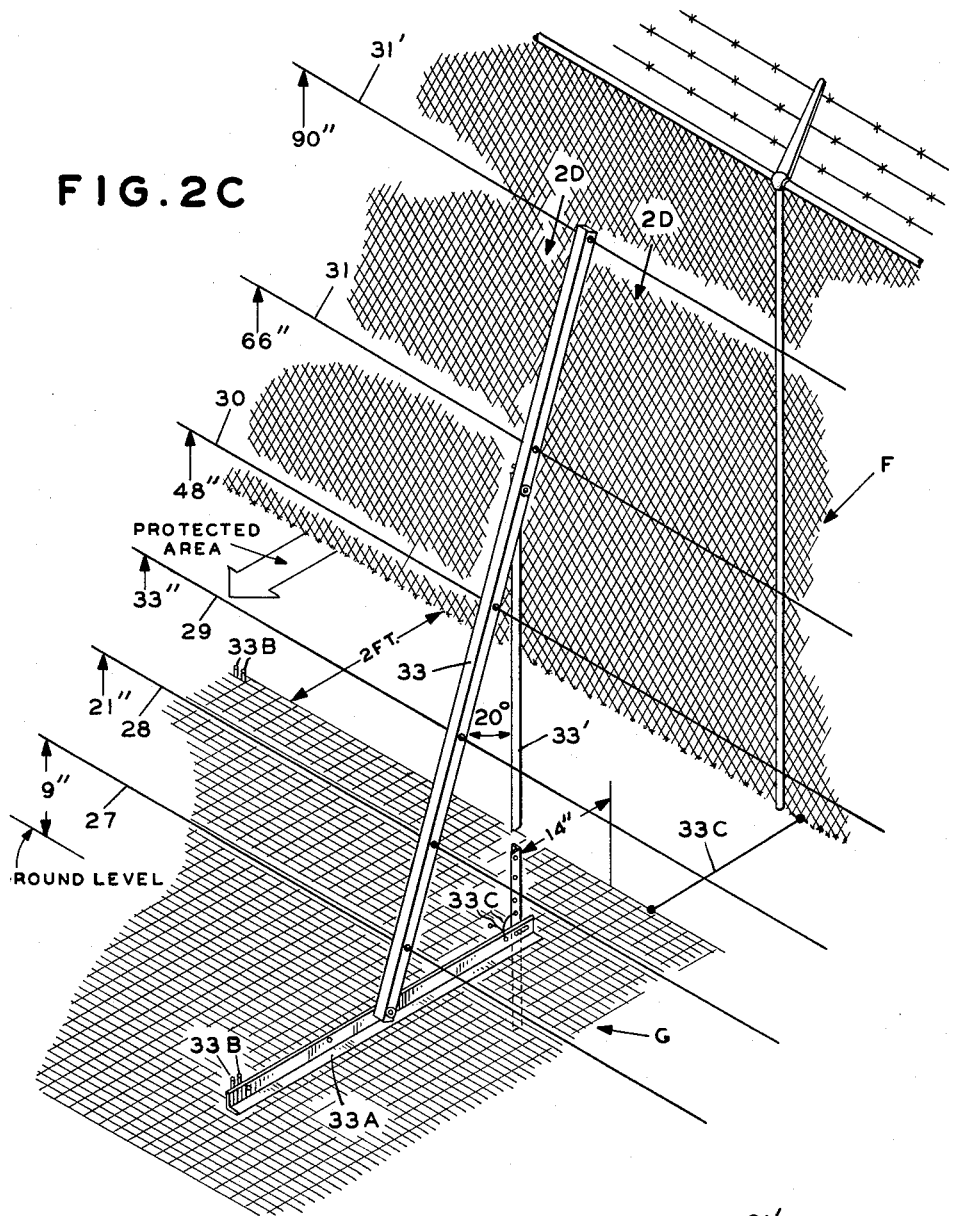
FIG. 2C illustrates a typical installation of the antenna of FIG. 2.
Figure 2D:
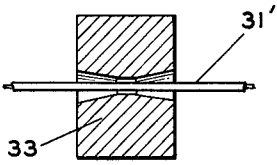
FIG. 2D is an enlarged sectional view taken along the line 2D—2D of FIG. 2C.

A typical installation is illustrated in FIG. 2C in which antenna wires 27-31' are shown supported by post 33. As shown in FIG. 2D, the antenna wires may be provided with an insulated covering which prevents electrical contact with the tapered holes in post 33 through which the wires pass. If desired, these holes may each have an insulated bushing carrying the individual wire passing therethrough. The heights of the individual wires shown in FIG. 2C are typical heights with respect to ground level. Other dimensions shown are typical and should not be considered as limitations but are merely given by way of example.

The post 33 is tilted at an angle of 20° with respect to a vertical brace 33' which preferably is driven into the ground. The post 33 and brace 33' are attached to a horizontal bar 33A which rests on and is mechanically and electrically connected to a wire mesh screen G serving as an artificial ground or counterpoise. The screen G is preferably connected to ground by metal stakes 33B driven into the ground at suitable intervals. The screen G is electrically connected to a chain link fence F by wires 33C provided at suitable intervals. The antenna wires are disposed in a plane which is at an inclination to the vertical which is preferably 20°±5°.

The conductors forming the respective antennas 20 and 21 lie in planes displaced from the common vertical center line in opposite directions so that the electromagnetic field formed about the antenna 20 is asymmetric with respect to the electromagnetic field formed about the antenna 21, i.e., the shape and extent of the field about the antenna 20 will be different from the shape and extent of the field about the antenna 21. The asymmetry referred to is with respect to approach to the antenna from one side or the other since the total field about one antenna should be equal to the total field about the other antenna to achieve proper weather compensation.

The asymmetry achieved with the antenna arrangement of FIG. 2 can be described in connection with FIGS. 2A and 2B. In FIG. 2A, $W_1$ and $W_2$ are energized wires at respective heights of $h_1$ and $h_2$ inches above the ground. $I_1$ and $I_2$ represent two intruders equally spaced from wires $W_1$ and $W_2$. Since intruders $I_1$ and $I_2$ are shown on opposite sides of the wires, it will be evident that if both approach the wires the effect is the same as two intruders approaching two vertical plane arrays of a balanced system from the same side. If two such vertical plane arrays are connected to two mutually compensating sources of energy, as has been the case in such systems, the effect of one intruder on one field will compensate the effect of the other intruder on the other field, provided they properly synchronize their motions.

FIG. 2B is intended to illustrate the field distribution achieved by inclining one array counterclockwise by an angle $\theta$ and the other array clockwise by the same angle. In this situation, intruder $I_1$ will find himself engulfed by a very much stronger field, whereas intruder $I_2$ will find himself engulfed by a very much weaker field. The tilting in opposite directions hence confronts the two intruders with an asymmetric field on the attacking side of the boundary which, for practical purposes, they cannot defeat by synchronized motion.

As shown in FIG. 2B, tilting shifts the center line of the electrostatic field of the top wire $W_1$ by a distance $l_1$. This distance is given by the following equation:

(1) $\qquad l_1 = h_1 \sin \theta$

At the same time tilting produces some loss in overall array height, the new height $h_1'$ being given by the following equation:

(2) $\qquad h_1' = h_1 \cos \theta$

From Equation 1 it will be observed that for a given position of intruder $I_1$ the field engulfing intruder $I_1$ will increase as $l_1$ increases, and hence will increase for greater values of the angle $\theta$. The greater the angle $\theta$ the greater will be the amount of asymmetry between the fields of the two antennas. On the other hand, from Equation 2 it will be seen that increasing the angle $\theta$ will decrease the height $h_1'$, so that in order to maintain a desired height for large values of $\theta$ more wire and other hardware will have to be used.

Equation 3 gives the derivatives of $l_1$ with respect to $\theta$, thus:

(3) $\qquad \dfrac{dl_1}{d\theta} = \dfrac{d}{d\theta}(h_1 \sin \theta) = h_1 \cos \theta$ Thus the rate of change of $l_1$ (field shift) will be, in accordance with the shape of a cosine curve, greatest for a value of $\theta$ equal to 0° and least for a value of $\theta$ equal to 90°.

Equation 4 gives the derivative of $h_1'$ with respect to $\theta$, thus:

(4) $\qquad \dfrac{dh_1'}{d\theta} = \dfrac{d}{d\theta}(h_1 \cos \theta) = -h_1 \sin \theta$ Thus the rate of change of $h_1'$ (antenna height) will be, in accordance with the sine curve, greatest for a value of $\theta$ equal to 90° and least for a value of $\theta$ equal to 0°.

In other words, as the value of $\theta$ increases from zero, initially small increases in $\theta$ will effect a relatively large shift in field location and a relatively small decrease in antenna height. It is preferable to select a value of $\theta$ which will combine a maximum lateral displacement of the field with a minimum reduction in antenna height. In this connection, it will be recalled that a maximum lateral displacement of the field will maximize asymmetry.

It is generally considered good practice with capacity fences to detect an average human being walking at a distance of 28 to 30 inches from a vertical antenna array. Moreover, it is generally considered good practice to make the top wire approximately seven feet high in a vertical array. Using these values in Equation 1:

(1) $\qquad h_1 \sin \theta = l_1$ $\qquad \sin \theta = \dfrac{29}{84} = .345$ $\qquad \theta = 20°$ (approximately)

From Equation 2, with $\theta = 20°$, the height of wire $W_1$ will drop from 84 inches to approximately 79 inches, which is a small loss in view of the substantial gain derived from the asymmetry achieved. In general, it has been found desirable to keep the angle $\theta$ within the range of about 15 to 25°.

Figure 3:
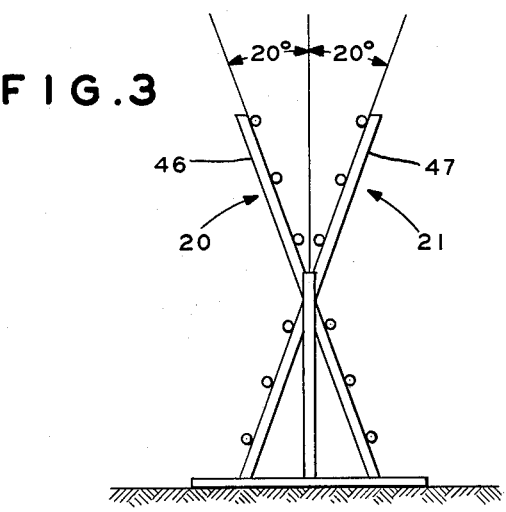
FIG. 3 is a schematic illustration of a modification of the array of FIG. 2.

In some cases space does not permit installation of the antennas as shown in FIG. 2, as, for example, where the capacity fence is to be located between a building wall and a closely adjacent chain link fence. In such case tilting of the antenna arrays may be effected as shown in FIG. 3. In FIG. 3 the antenna 20, here shown as comprising an array of six spaced wires, is mounted on supports 46 tilted at an angle of 20° from the vertical, while the antenna 21 is mounted on supports 47 tilted at an angle of 20° from the vertical. While both antennas are shown from the side in FIG. 3, it will be understood that, as in FIG. 2, each extends over a respective portion of the boundary.

Figure 4A:
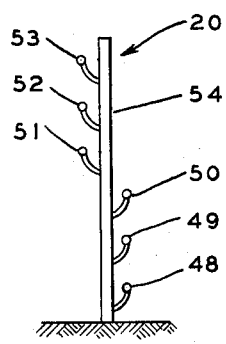
FIGS. 4A and 4B illustrate schematically another form of antenna array in accordance with the invention.
Figure 4B:
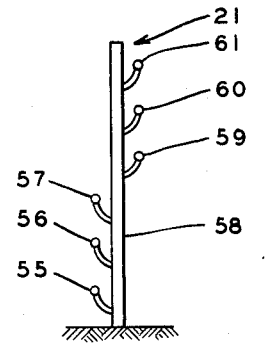

The antenna construction shown in FIG. 2 is the preferred form of construction in accordance with the invention because of the shape of field produced and because of economy of installation. However, asymmetry can be achieved in other ways. Thus, in FIG. 4A antenna 20 is formed from an array of six vertically spaced horizontal wires 48, 49, 50, 51, 52 and 53 mounted on support post 54. The lower three wires 48–50 may be considered as being on that side of the post 54 facing the inside of the protected area, while the upper three wires 51–53 may be considered as being on that side of the post 54 facing outside of the protected area, or vice versa. For the antenna 21 shown in FIG. 4B, the lower three wires 55, 56 and 57 are mounted on that side of the posts 58 facing the outside of the protected area, while the upper three wires 59, 60 and 61 are mounted on that side of the posts 58 facing the inside of the protected area, or vice versa. In other words, the positions of the upper three wires and the lower three wires are transposed in antenna 21 from the positions of the corresponding wires in antenna 20. The resulting asymmetry of the electromagnetic fields will be enhanced if the various wires are mounted away from the posts on insulators, as shown.

Figure 5A:
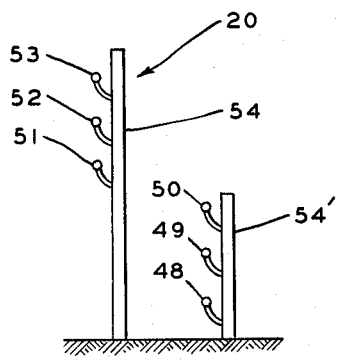
FIGS. 5A and 5B illustrate schematically another form of antenna array in accordance with the invention.
Figure 5B:
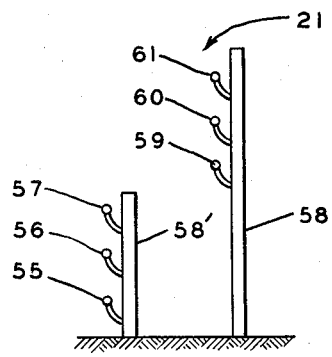

In FIGS. 5A and 5B a more pronounced asymmetry is achieved by mounting the upper three wires of each antenna on separate posts from the lower three wires. Thus the post 54' carries wires 48–50, while the post 58' carries wires 55–57. In FIG. 5A the post 54' might be located outwardly of the protected boundary with respect to the post 54, while in FIG. 5B the post 58' would then be located inwardly of the protected boundary with respect to the post 58. The spacing between the posts 54 and 54' and between the posts 58 and 58' is preferably approximately 30 inches.

Figure 6A:
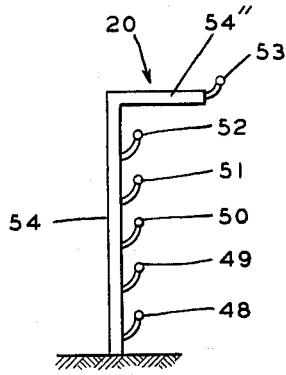
FIGS. 6A and 6B illustrate schematically another form of antenna array in accordance with the invention.
Figure 6B:
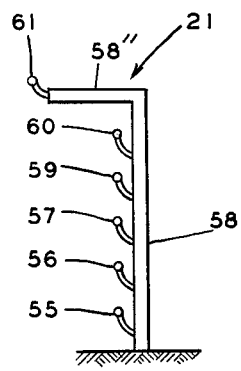

FIGS. 6A and 6B illustrate an antenna arrangement in which the top wire of each antenna is displaced in a respective direction with respect to the boundary. Thus in FIGS. 6A and 6B the supporting posts 54 and 58 are shaped like gallows with the topmost wire 53 supported on the end of crosspiece 54'' and the topmost wire 61 supported on the end of crosspiece 58''. If the crosspiece 54'' extends outwardly of the boundary, the crosspiece 58'' will extend inwardly of the boundary. It is desirable that the lateral spacing between the topmost conductor of each antenna and the remaining conductors of that antenna be in the neighborhood of 30 inches.

*Oscillator module*

Figure 7:
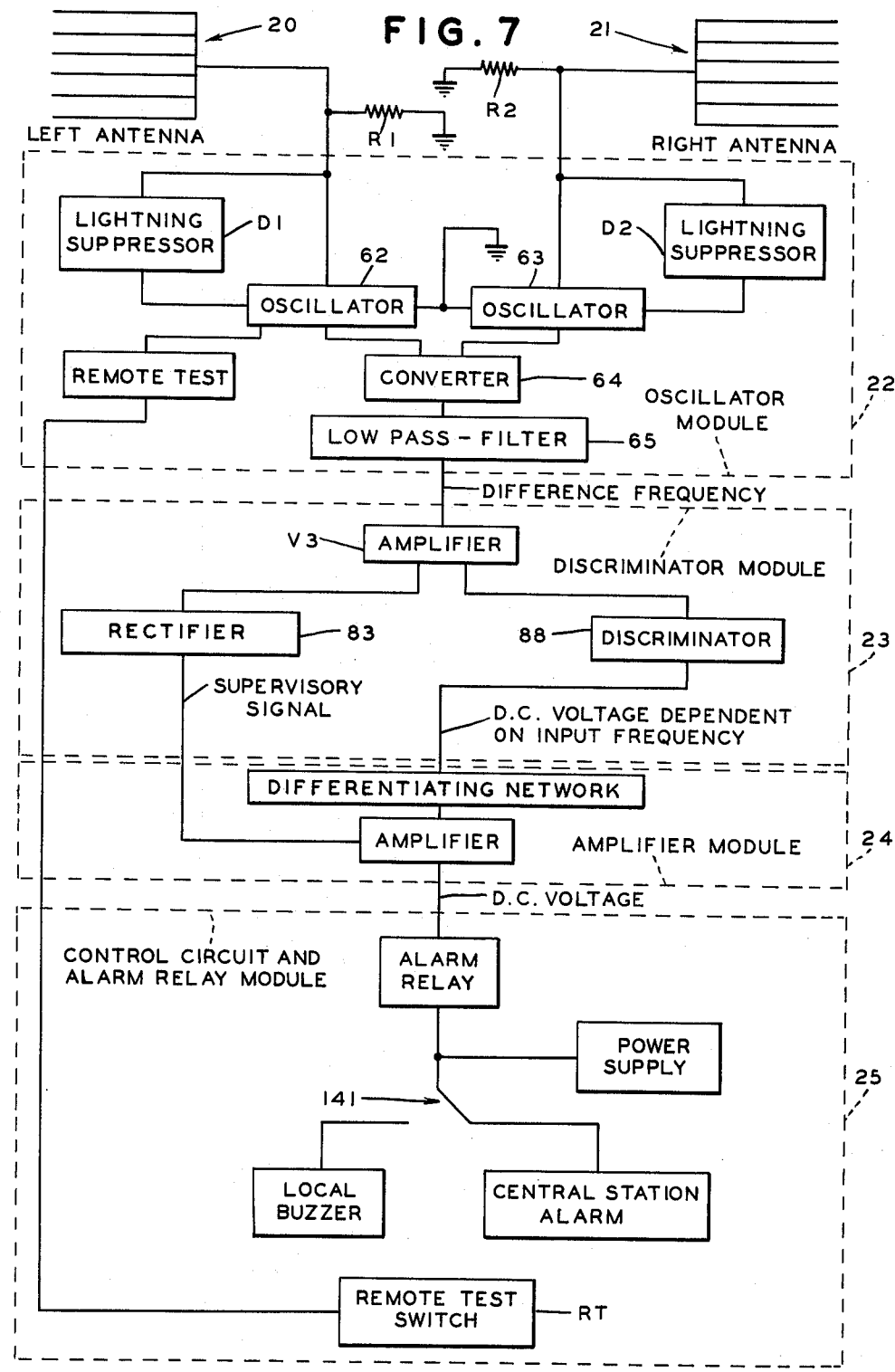
FIG. 7 is a detailed block diagram of the system of the invention.
Figure 8:
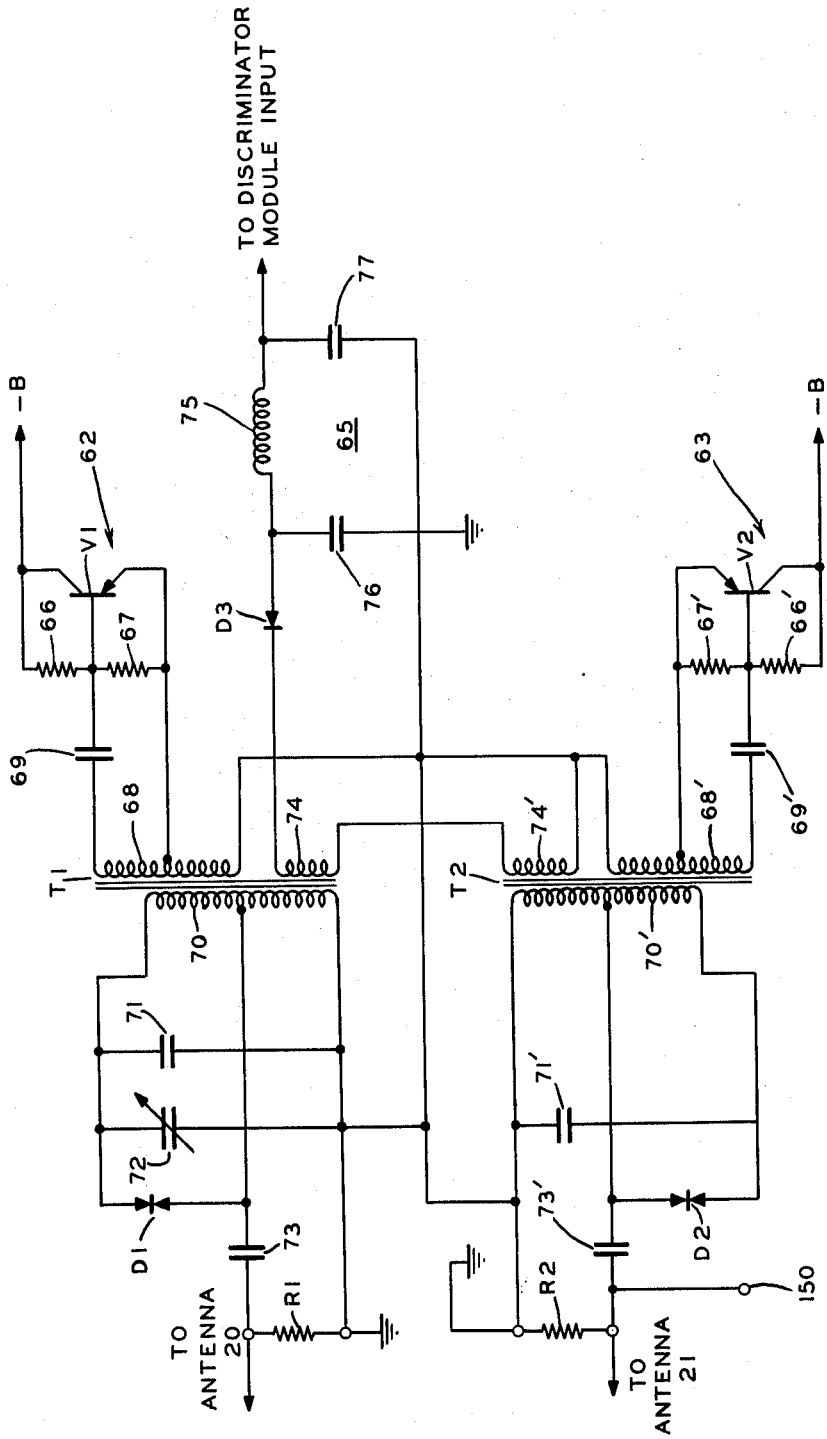
FIG. 8 is a schematic diagram illustrating the oscillator module of FIG. 7.

Referring now to FIGS. 7 and 8, there is shown the oscillator module comprising an oscillator 62 which supplies RF energy to antenna 20, an oscillator 63 which supplies RF energy to antenna 21, a converter 64 which mixes the frequencies of oscillators 62 and 63, and a low pass filter 65 which suppresses the individual oscillator frequencies and their sum so as to pass only the difference frequency to the discriminator module.

It is desirable that the oscillator frequencies be relatively close to each other so that the difference frequency will be a low audio frequency, e.g., 2 kc. It is also desirable that the oscillator frequencies be low radio frequencies so that the antenna lengths will be but a small fraction of a wave length, thus inhibiting radiation. By way of example, it has been found satisfactory to tune oscillator 62 to 30 kc. and oscillator 63 to 28 kc. Frequencies in the range of about 15 to 40 kc. have been found desirable because of low leakage and low ground was encountered in this range.

Referring particularly to FIG. 8, oscillator 62 comprises a transistor V1 connected in a regenerative circuit, while oscillator 63 comprises a transistor V2 likewise connected in a regenerative circuit. Transistors V1 and V2 might be, for example, of the 2N123 type.

The collector of transistor V1 is connected to a source of negative polarity operating potential —B. Resistors 66 and 67 are connected in series between the collector and emitter of transistor V1 to serve as a voltage divider to provide D.C. bias potentials for the transistor electrodes. The base of transistor V1 is connected to the junction of resistors 66 and 67. The base of transistor V1 is coupled to one end of a secondary winding 68 of a transformer T1 through a D.C. blocking capacitor 69. The other end of winding 68 is connected to ground potential, while an intermediate tap on winding 68 is connected to the emitter of transistor V1, thus providing positive A.C. feedback from the emitter to the base circuit to sustain oscillations.

Transistor V2 is similarly connected with respect to a transformer T2, the elements 66', 67', 68' and 69' corresponding to the elements 66, 67, 68 and 69, respectively.

Primary winding 70 of transformer T1 and parallel connected capacitor 71 form the tank circuit which basically determines the frequency of oscillator 62. Primary winding 70' and capacitor 71' perform a like function for oscillator 63. For fine frequency adjustments, a trimmer capacitor 72 is connected in parallel with capacitor 70.

Antenna 20, with its distributed capacitance to ground, is coupled to an intermediate tap on primary winding 70 through a capacitor 73 to serve as a capacitive load on the tank circuit of oscillator 62. Antenna 21 is similarly coupled to an intermediate tap on primary winding 70' through a capacitor 73' to serve as a capacitive load on the tank circuit of oscillator 63.

It will be evident that the capacities to ground of antennas 20 and 21 form effective frequency determining elements for the oscillators 62 and 63, respectively, so that alteration in either capacity to ground will alter the operating frequency of the corresponding oscillator. Specifically, an increase in the capacity to ground of either antenna, as by the approach of an intruder to a point within the effective field of energy surrounding that antenna, will cause a decrease in the frequency of the corresponding oscillator.

A bi-polar zener diode D1 is connected between the tap on the primary winding 70 and the high (nongrounded) end of this winding to suppress transient voltages induced by atmospheric electrical discharges, such as lightning, in excess of the generated oscillator voltage. A like diode D2 is similarly connected with respect to winding 70'. Diodes D1 and D2 might be, for example, of the 1N1832 type.

A resistor R1, which may be located physically near the antenna 20, is connected between antenna 20 and ground to allow electrostatic charges to flow from the antenna to ground. A similar resistor R2 is connected between antenna 21 and ground. Typically, R1 and R2 might each be about 39,000 ohms.

The transformers T1 and T2 are provided with additional secondary windings 74 and 74', respectively, which are connected in series between ground and one terminal of a converter diode D3, which might be, for example, of the 1N307 type. Windings 74 and 74' each have induced therein a voltage whose frequency corresponds to that of oscillators 62 and 63, respectively. These voltages are combined in diode D3 and produce sum and difference beat frequencies. The sum frequency and the individual oscillator frequencies are suppressed by a low pass filter 65 intercoupling the output of diode D3 and the input terminal of the discriminator module. This filter comprises a choke 75 and capacitors 76 and 77. Thus the output of filter 65 is a voltage at the difference beat frequency of oscillators 62 and 63.

*Discriminator module*

Figure 9:
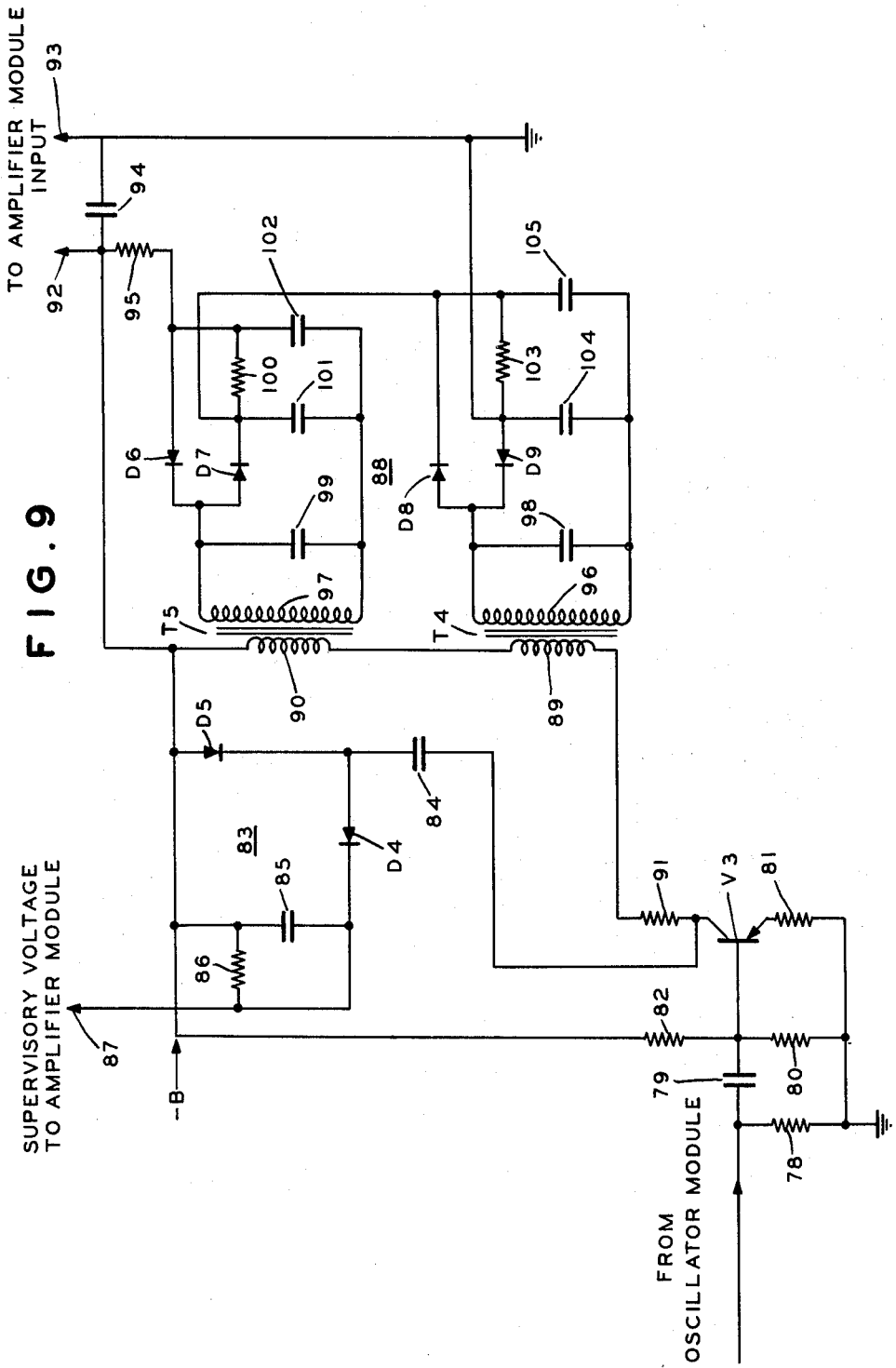
FIG. 9 is a schematic diagram illustrating the discriminator module of FIG. 7.

The discriminator module 23 is illustrated in detail in FIG. 9. The difference frequency output from the oscillator module appears across a resistor 78 and is supplied through a coupling capacitor 79 to the base of a transistor V3. The transistor V3 might be of the 2N250 type. The base and emitter of transistor V3 are coupled to ground potential through resistors 80 and 81, respectively. The base of transistor V3 is also coupled to the source of negative operating potential —B through a resistor 82. Resistors 80, 81 and 82 form a voltage divider affording biasing potentials for transistor V3.

Transistor V3 serves as an amplifier for the difference frequency output of the oscillator module. A portion of the amplified output of transistor V3 is supplied to a D.C. voltage doubler circuit 83 through a capacitor 84, one end of which is connected to the collector of transistor V3. The voltage doubler circuit comprises diodes D4 and D5, which might be of the 624C type, a capacitor 85 and a resistor 86. The D.C. voltage appearing between the free end of resistor 86 (terminal 87) and ground is supplied to the amplifier module as a supervisory voltage. Should the amplified voltage at the collector of transistor V3 fall off for any reason, as by equipment failure, the supervisory voltage will likewise fall off and initiate a signal, as will be described hereinafter.

Another portion of the amplified voltage at the collector of transistor V3 is supplied to a discriminator circuit 88 which comprises two transformers T4 and T5 and four diodes D6, D7, D8 and D9, each of which might be of the 624C type. Primary windings 89 and 90 of transformers T4 and T5, respectively, are connected in series, the free end of winding 89 being coupled to the collector of transistor V3 through a resistor 91 and the free end of winding 90 being connected to the —B terminal and to alarm signal output terminal 92. The other alarm signal output terminal 93 is coupled to terminal 92 by a capacitor 94 which, together with a resistor 95, forms an integrating circuit.

Secondary windings 96 and 97 of transformers T4 and T5, respectively, are connected in parallel with capacitors 98 and 99, respectively. The inductances of the secondary windings are different and they are tuned by capacitors 98 and 99 having different capacitances to provide two tuning curve peaks shifted by the proper amount so as to provide a linear voltage output for a given change in the difference frequency output. It is desirable that the voltage output have a median value at a difference frequency corresponding to the nominal difference frequency, e.g., 2 kc.

Diodes D6 and D7 in combination with a resistor 100 and capacitors 101 and 102 rectify and double the A.C. voltage appearing across capacitor 99 of discriminator tuned circuit 97, 99. Similarly, diodes D8 and D9 in combination with a resistor 103 and capacitors 104 and 105 rectify and double the A.C. voltage appearing across capacitor 98 of discriminator tuned circuit 96, 98. The junction of rectifier D6 and resistor 100 is coupled to output terminal 92 through resistor 95. The junction of rectifier D7 and resistor 100 is connected to the junction of rectifier D8 and resistor 103. The junction of rectifier D9 and resistor 103 is connected to output terminal 93. The rectifiers D6–D9 are poled so that the double rectified voltage outputs of the two discriminator tuned circuits are of opposite sign and will combine in opposition.

By proper selection of circuit constants, good linearity of the D.C. voltage between terminals 92 and 93 can be obtained for changes in the difference frequency over a considerable range of difference frequencies. By maintaining such a linear relationship between the D.C. voltage and the difference frequency, the signal level at which an alarm is initiated may be closely controlled even for large drifts of antenna capacity. It is not desirable that an alarm result from small changes in difference frequency, such as might be caused by the approach of a small animal to one of the antennas. The integration action afforded by resistor 95 and capacitor 94 affords a smoothing of the D.C. voltage between terminals 92 and 93.

By way of example, typical circuit constants for the discriminator circuit might be as follows for a difference frequency of 2 kc.:

| Element | Ohms | Microfarads | Turns |
|---|---|---|---|
| 89 | | | 62 |
| 90 | | | 58 |
| 91 | 50 | | |
| 94 | | 0.1 | |
| 95 | 150K | | |
| 96 | | | 2470 |
| 97 | | | 2330 |
| 98 | | 0.006 | |
| 99 | | 0.003 | |
| 100 | 1.5M | | |
| 101 | | 0.02 | |
| 102 | | 0.02 | |
| 103 | 1M | | |
| 104 | | 0.02 | |
| 105 | | 0.02 | |

It should be understood that these values and other values and types set forth herein (with the exception of the preferred range of the angle θ) are given by way of example and may be varied widely in accordance with particular design conditions and preferences.

*Amplifier module*

Figure 10:
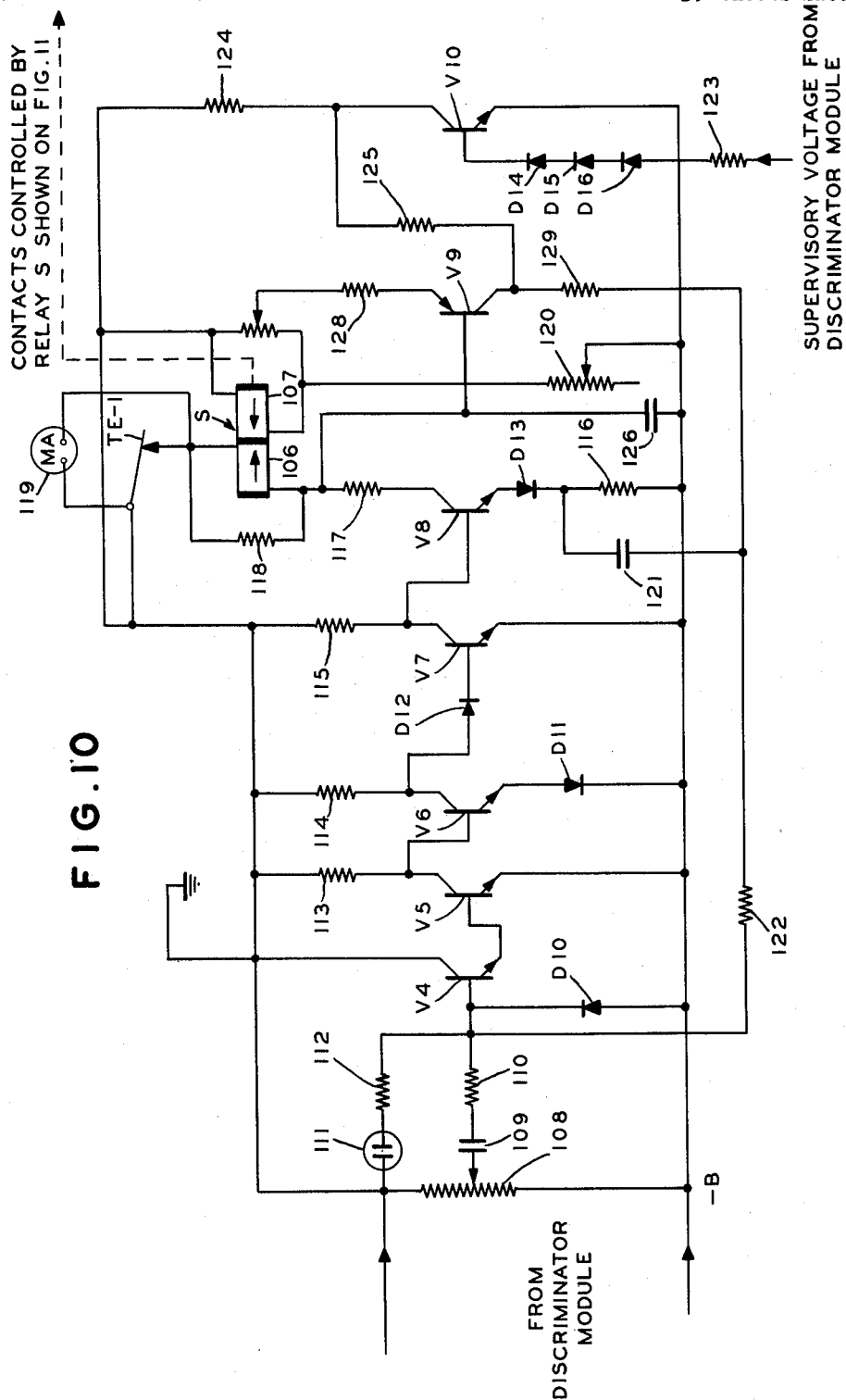
FIG. 10 is a schematic diagram illustrating the amplifier module of FIG. 7.
Figure 11:
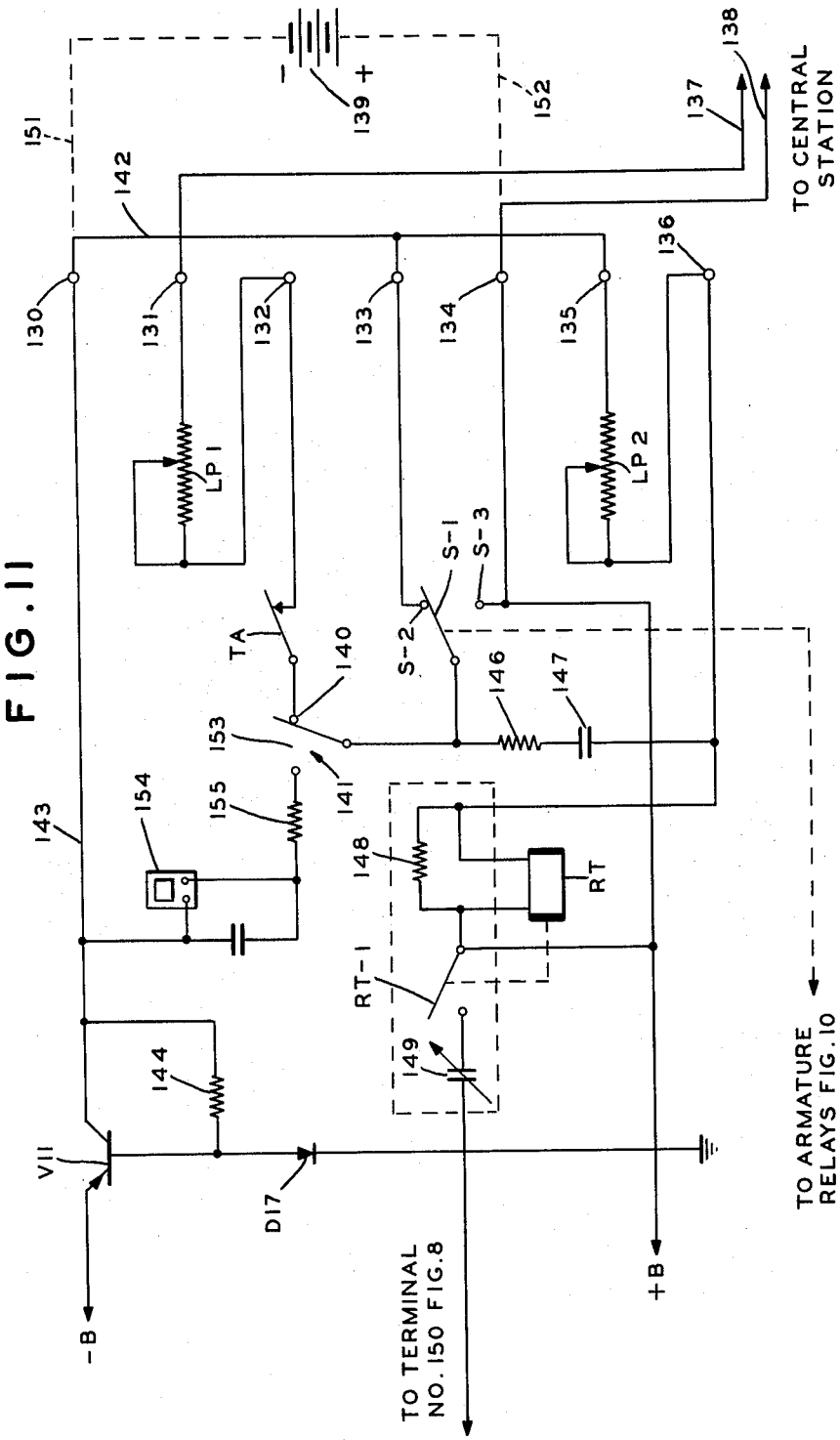
FIG. 11 is a schematic diagram illustrating the control circuit and alarm relay module of FIG. 7.

The amplifier module 24 is shown in detail in FIG. 10 and includes a five stage stabilized low frequency amplifier comprising transistors V4, V5, V6, V7 and V8, a control transistor V9, and a supervisory transistor V10. The operating coils 106 and 107 of differential alarm relay S are shown in FIG. 10, while the contacts of this relay are shown in FIG. 11. However, physically the relay S is embodied in the control circuit and alarm relay module 25. Showing the coils of relay S in FIG. 10 is a matter of convenience since the energizing circuits therefore are in the amplifier module 24. The transistors V4 and V5 might be of the 2N336 type, the transistors V6, V7, V8 and V10 might be of the 2N167 type, while the transistor V9 might be of the 2N495 type.

The D.C. output voltage from terminals 92 and 93 of discriminator module 23 appears across the winding of a potentiometer 108 which serves as the amplifier sensitivity control. Changes in the signal voltage across potentiometer 108 produce changes in the base-collector potential of transistor V4 due to the coupling of the slider of potentiometer 108 to the base of transistor V4 through a differentiating network comprising a capacitor 109 and a resistor 110. Capacitor 110 serves to prevent application of the negative supply potential to the base of transistor V4 and to allow only changes in the potential at the slider of potentiometer 108 to be applied to the base of transistor V4.

A neon tube 111 an da resistor 112 are connected between the base of transistor V4 and ground so that any excessive negative or positive voltages fed to the input circuit of V4 will energize neon tube 111 and produce a permanent alarm signal. The neon tube 111 thus supervises against shift of the operating difference frequency from the linear portion of the discriminator curve since the voltage will increase to large positive or negative values and will fire the neon tube at the end of the linear portion of the curve. Protection in the case of large negative voltages is also provided by a diode D10, which might be of the 1N461 type, connected between the base of transistor V4 and the negative potential supply —B.

The collector of transistor V4 is connected to ground, while the emitter thereof is connected to the base of amplifier transistor V5. The emitter of transistor V5 is connected to negative supply potential —B, while the collector thereof is coupled to ground through a load resistor 113 and is connected to the base of amplifier transistor V6. A diode D11, which might be of the 1N461 type, is coupled between the emitter of transistor V6 and the —B terminal. The forward voltage drop across diode D11 increases the collector voltage of V5. The collector of transistor V6 is coupled to ground through a load resistor 114 and is coupled to the base of fourth stage transistor amplifier V7 through diode D12, which might be of the 1N461 type. Diode coupling between transistors V6 and V7 offsets the effect of the voltage drop across diode D11 which would otherwise not make any collector voltage available for V6.

A load resistor 115 intercouples the collector of transistor V7 and ground potential. The emitter of transistor V7 is connected to negative supply terminal —B. The collector of transistor V7 is connected directly to the base of the fifth and final transistor amplifier V8. The emitter of transistor V8 is coupled to negative supply terminal through a diode D13, which might be of the SD–91A type, and a resistor 116. The collector of transistor V8 is coupled to ground potential through a load circuit comprising a resistor 117, coil 106 of differential relay S and normally closed contacts TE–1 of a test switch. A resistor 118 is connected across the coil 106 to bypass some of the collector current of transistor V8. The total collector current may be measured by opening switch contacts TE–1, which inserts a milliammeter 119 in the collector circuit.

Winding 107 of differential relay S is supplied with a fixed current through a circuit extending from ground potential through coil 107 and a potentiometer 120 to negative supply terminal —B. Adjustment of the slider of potentiometer 120 provides adjustment of the balancing current through coil 107.

The five stage amplifier gain is stabilized by means of negative feedback. For this purpose, the potential developed across resistor 116 in the emitter circuit of transistor V8 is supplied to the base of input transistor V4 through a capacitor 121 and a resistor 122.

The supervisory voltage, which is a D.C. potential proportional to the output of V3 is supplied from terminal 87 of the discriminator module to the base of transistor V10 through a resistor 123 and diodes D14, D15 and D16, which might each be of the 1N461 type. The emitter of transistor V10 is connected to negative supply terminal —B. The collector of transistor V10 is coupled to ground potential through a resistor 124 and to the collector of transistor V9 through a resistor 125.

The base of transistor V9 is coupled to negative supply terminal —B through a capacitor 126, which is provided for stabilizing purposes. The base of transistor V9 is also connected to the junction of resistor 117 and coil 106 in the collector circuit of transistor V8. The emitter of transistor V9 is coupled to the slider of a potentiometer 127 through a resistor 128, potentiometer 127 being coupled across the fixed current coil 107 of relay S. The collector of V9 is coupled to the base of V4 through a resistor 129 and resistor 122.

The function of transistors V9 and V10 is to check the condition of all the preceding components and circuits as well as the absence or failure of the power supply. Thus, with the oscillator and discriminator module circuits in proper operating condition, a negative voltage is supplied from the discriminator to the amplifier through resistor 123 and diodes D14–D16. This negative voltage causes transistor V10 to conduct, dropping its collector voltage to practically zero. If the supervisory voltage drops below a predetermined value, transistor V10 will become nonconductive and a negative potential will appear at the collector of V9 which acts to unbalance the amplifier and energize relay S.

The time constant of the circuit including resistor 129 should be relatively large, e.g., 450 seconds, so that changes in input voltage are slowly corrected by the stabilizing transistor V9. Resistor 116 may be very small, e.g., 10 ohms. The time constant with respect to the alarm voltage supplied to the input circuit of transistor V4 through capacitor 109 and resistor 110 is preferably relatively short and is determined largely by these elements. Capacitor 109 might have a value of 4 microfarads and resistor 110 might have a value of 820K ohms, giving a time constant of about 3.3 seconds, or approximately 4 seconds including a part of potentiometer 108. It will be evident that the alarm signal voltage will be effective to change the alarm relay current with only a short time delay while the negative feedback due to automatic correction of the operating point by V9 will be effective only after a substantial time delay.

Transistor V9 is used to correct the D.C. operating point of the amplifier. Thus it supervises the normal operating point of transistor V8 by tending to adjust its collector current. Part of the V9 collector current also flows into the base of transistor V4 thus helping to maintain the normal operating point of V8. This arrangement is helpful in offsetting parameter variations in the transistors caused by aging and temperature variations.

As will be described hereinafter, when the current through coil 106 drops to a predetermined value, an alarm signal will be initiated by operation of contacts of relay S. When an increase or decrease in the alarm signal voltage across potentiometer 108 occurs, the input to amplifier transistor V4 similarly increases or decreases, resulting in a corresponding increase or decrease in the collector current of transistor V8 and in the current through coil 106. Since relay S is a differential relay, either an increase or decrease in the current through coil 106 beyond predetermined limits will initiate an alarm signal by operation of contacts of relay S.

*Control circuit and alarm relay module*

The control circuit and alarm relay module is shown in detail in FIG. 11. Alternative connections for two different types of operation are shown, these being central station operation and local operation. In FIG. 11 there are shown terminals 130, 131, 132, 133, 134, 135 and 136. The central station line is shown by conductors 137 and 138, which are connected to terminals 131 and 134, respectively. With central station operation it is desirable under some circumstances that operating power be supplied over the same central station line used for signalling. Thus, at the central station a suitable operating potential will be supplied to the conductors 137 and 138, e.g., 24 volts with the positive potential applied to conductor 138. For local operation or where a local power source is to be used, a local source of potential will be provided, here shown as a battery 139 which may be connected to terminals 130 and 134. A suitable voltage for the power supply might be, for example, 24 volts. Where a number of systems are to be operated, it becomes economical to use two central station conductors to supply operating power for all the systems. In such case the battery 139 (or equivalent) would be provided at the central station and power supplied therefrom to terminals 130 and 134.

The negative voltage supplied to terminal 131 is supplied to a voltage regulator comprising a power transistor V11, which might be of the 2N250 type, and a zener diode D17, which might be of the 653C9 type. The circuit extends from terminal 131 through a line current regulating potentiometer LP1, terminal 132, tamper protection contacts TA, contacts 140 of a manual switch 141, armature S–1 and contact S–2 of alarm relay S (FIG. 10), terminal 133, conductor 142, terminal 130 and conductor 143 to the collector of transistor V11. In the case of a separate power line, the negative power conductor will be connected directly to terminal 130 and the conductor 142 will be disconnected. The base of transistor V11 is coupled to ground through diode D17 and to the collector of transistor V11 through a resistor 144. The load circuit for transistor V11 is formed by the various −B terminals previously referred to which are connected to the emitter of transistor V11. The load voltage is maintained practically constant at about the breakdown voltage of zener diode D17 which, in series with resistor 144, forms a divider voltage for the input voltage between conductor 143 and ground. The voltage drop across the zener diode D17 is the base-emitter voltage of transistor V11 which controls the load current of the transistor V11.

When relay S is in its balanced condition, armature S–1 makes with contact S–2. By balanced condition is meant that the current through coil 106 lies within a predetermined range for a particular value of the current through coil 107, as set by potentiometer 120. By way of example, the current range through coil 106 at which the relay will be balanced might be the range of 2.0 to 7.0 milliamperes for a current through coil 107 adjusted 4.5 milliamperes. Should the current through coil 106 drop below 2.0 milliamperes or rise above 7.0 milliamperes (or other predetermined values), the relay S will become unbalanced and armature S–1 will leave contact S–2 and make with contact S–3.

When armature S–1 leaves contact S–2, the central station receives a break or open signal of momentary duration caused by opening of the normally closed circuit between conductors 137 and 138 and extending from terminal 131 through potentiometer LP1, terminal 132, contacts TA, switch contacts 140, armature S–1 and contact S–2, terminal 133, conductor 142, terminal 135, a line current regulating potentiometer LP2, terminal 136, and the coil of a remote test relay RT to terminal 134. As soon as armature S–1 makes with contact S–3, ground potential is applied to armature S–1, thus reducing the resistance in the circuit between lines 137 and 138 by the resistance of potentiometer LP2 and the coil of relay RT, since these are effectively shorted out. Hence, the current flow in the central station line, after momentarily stopping, increases substantially and provides a so-called ground signal. The stoppage of line current followed by the substantial increase in current will be detected at the central station by galvanometer type relays or other means to provide an alarm signal, as is well known.

A resistor 146 and a capacitor 147 are connected in series between armature S–1 and ground as an arc quenching circuit for the relay contacts.

It is desirable that the integrity of the system be supervised periodically from the central station. For this purpose, a relay RT is included in the series circuit between ground and central station line 137. Relay RT is designed to operate on a line current substantially higher than normal, e.g., the current which would flow therethrough when a test battery voltage of double the normal voltage is applied to conductors 137 and 138 at the central station. A resistor 148 is connected in parallel with the coil of relay RT to lower the current flow through relay RT.

Where relay RT is energized, normally open contacts RT–1 thereof are closed, connecting a capacitor 149 between terminal 150 of the oscillator module (FIG. 8) and ground. This effectively places capacitor 149 in parallel with the capacitance to ground of antenna 21 and simulates the approach of an intruder to antenna 21. The resultant change in operating frequency of oscillator 63 caues a change in the beat frequency and a resultant change in the current flow through coil 106 of relay S sufficient to operate armature S–1 to contact S–3, signalling an alarm to the central station. In this case an alarm signal represents a successful test of the system. The central station returns the line voltage to normal, relay S becomes balanced, returning armature S–1 to contact S–2, and relay RT drops out, disconnecting capacitor 149 from antenna 21. Should operation of relay RT not produce an alarm, the central station will dispatch a maintenance man or guard to ascertain the reason for the failure and to take corrective measures.

For local operation, a battery or other source of D.C. operating potential may be connected to terminals 130 and 134, as shown by the dashed lines 151 and 152; manual switch 141 is operated to the opposite position, opening contacts 140 and closing contacts 153; and conductor 142 is removed. With this arrangement, when relay S operates connecting armature S–1 to contact S–3, an energizing circuit for a local buzzer 154 is completed. This circuit extends from negative D.C. conductor 143 through the coil of buzzer 154, a current limiting resistor 155, contacts 153, armature S–1, and contact S–3 to ground. To provide for remote testing with local operation, relay contact RT–1 may be replaced with a manual switch or may be manually operated.

*Operation*

In normal operation of the system, oscillators 62 and 63 operate at substantially their intended frequencies. The actual oscillator frequencies will vary to some extent as weather conditions and the like cause minor variations in the capacities to ground of antennas 20 and 21. The oscillator frequencies are mixed in converter 64 and the difference frequency, e.g., 2 kc., is amplified in amplifier V3 and is used to produce a D.C. voltage in the output of discriminator 88, which D.C. voltage is proportional to the input frequency. For normal operation, this voltage will have a substantially constant value. Changes therein are amplified and, if sufficiently great, operate alarm relay S, transmitting an alarm signal. An alarm signal will also be initiated if a supervisory voltage derived from the output of amplifier V3 drops below a predetermined value.

An alarm is initiated when an intruder approaches one of the antennas, changing its capacitance to ground and thus changing the frequency of the corresponding oscillator. Should two intruders approach respective antennas in an attempt to defeat the system, the effect of each on the corresponding oscillator will be different because of the asymmetry of the fields about the two antennas.

A change in the frequency of one or both antennas caused by one or more intruders will change the difference frequency; either an increase or a decrease in the difference frequency will occur depending upon which antenna is approached or, if both are approached, upon which antenna experiences the greatest interference with its electromagnetic field.

The discriminator 88 produces a D.C. voltage which increases or decreases with increases or decreases, respectively, in the difference frequency from its normal value. The rate of increase or decrease of this D.C. voltage is amplified and, if sufficiently great, operates the alarm relay to transmit an alarm.

*Electronic asymmetry*

The asymmetry of the fields of the two antennas in the arrangements previously discussed has been achieved by altering the physical or geometric disposition of the antenna wires. The asymmetry has existed, however, only when considered from one side of the protected boundary, since the total field produced by one antenna has been equal to the total field produced by the other antenna, which provides weather compensation. Similar asymmetry may be achieved electronically with antenna arrays which are physically identical.

Thus, in FIG. 12, antenna 20 and antenna 21 may be identical, each comprising an identical series of horizontally spaced wires located in a single horizontal plane. The respective spacings between conductors 160, 161 and 162 of antenna 20 may be identical with the corresponding spacings between conductors 163, 164 and 165 of antenna 21.

The desired asymmetry of the fields is introduced by electrically insulating the conductors from each other and coupling corresponding conductors of each antenna to respectively opposite electrical positions in the respective oscillator tank circuits. Thus, conductor 160 of antenna 20 is shown connected to the high side of tank circuit coil 70, while corresponding conductor 163 of antenna 21 is connected to the low (ground) side of tank circuit coil 70'. The middle conductors 161 and 164 are each connected to the midpoint of the corresponding respective tank circuit coils. The conductor 162 of antenna 20 is connected to the low side of coil 70, while corresponding conductor 165 of antenna 21 is connected to the high side of coil 70'. Thus the intensity of the field created around the conductors will be greatest for the conductors 160 and 165 which are connected to the high sides of the respective tank circuits and least for the conductors 162 and 163 which are connected to the low sides of the respective tank circuits. With this arrangement the shape intensity distribution of the field in a plane transverse of the boundary will be different for antenna 20 than the corresponding shape for antenna 21, so that the response of antenna 20 to the approach of an intruder at one point will be different from the response of antenna 21 to the coordinated approach of another intruder at a corresponding point. In this way the asymmetry will prevent defeat by simultaneous coordinated attack by two intruders while nevertheless making the total field about the two antennas equal so that proper weather compensation is achieved.

Other means of achieving asymmetry may be used, but asymmetry resulting from geometric arrangement of the wires is preferred and the tilted array of FIG. 2 is considered by far the most satisfactory.

While the invention has been described in connection with specific embodiments thereof and in specific uses, various modifications thereof will occur to those skilled in the art without departing from the spirit and scope of the invention as set forth in the appended claims.

What is claimed is:

1. The method of electrically protecting a boundary and detecting the approach of an intruder thereto, comprising the steps of generating first and second radio frequency oscillations, radiating a portion of the energy of said first oscillation along said boundary to establish a first electromagnetic field extending along said boundary in one direction from an intermediate point, radiating a portion of the energy of said second oscillation along said boundary to establish a second electromagnetic field extending along said boundary in the other direction from said intermediate point, said electromagnetic fields being asymmetric with respect to each other in a direction normal to said boundary but being substantially balanced in a direction parallel to said boundary, varying the frequency of either of said oscillations in response to the entry of an intruder into the corresponding one of said electromagnetic fields, and producing an alarm signal in response to at least a minimum variation in the ratio between the frequencies of said oscillations, said asymmetry of said fields being sufficient so that simultaneous and coordinated approach of two intruders to corresponding points of said boundary on opposite sides of said intermediate point do not produce effects on the frequencies of said oscillations which are sufficiently similar as to prevent production of an alarm signal.

2. The method of electrically protecting a boundary and detecting the approach of an intruder thereto, comprising the steps of generating first and second radio frequency oscillations, radiating a portion of the energy of said first oscillation along said boundary to establish a first electromagnetic field extending along said boundary in one direction from an intermediate point, radiating a portion of the energy of said second oscillation along said boundary to establish a second electromagnetic field extending along said boundary in the other direction from said intermediate point, said electromagnetic fields being asymmetry with respect to each other in a direction normal to said boundary but being substantially balanced in a direction parallel to said boundary and producing an alarm signal in response to the differential effect produced on said fields by the approach of an intruder to one of said fields, said asymmetry of said fields being sufficient so that simultaneous and coordinated approach of two intruders to corresponding points of said boundary on opposite sides of said intermediate point do not produce effects which are sufficiently similar as to prevent production of an alarm signal.

3. The method of electrically protecting a boundary and detecting the approach of an intruder thereto, comprising the steps of generating first and second radio frequency oscillations, radiating a portion of the energy of said first oscillation along said boundary to establish a first electromagnetic field extending along said boundary in one direction from an intermediate point, radiating a portion of the energy of said second oscillation along said boundary to establish a second electromagnetic field extending along said boundary in the other direction from said intermediate point, said electromagnetic fields being asymmetric with respect to each other in a direction normal to said boundary but being substantially balanced in a direction parallel to said boundary, varying the frequency of either of said oscillations in response to the entry of an intruder into the corresponding one of said electromagnetic fields, mixing a portion of the energy of said oscillations to produce a beat frequency signal, filtering said signal to suppress frequency components other than the difference frequency, and producing an alarm signal in response to changes in said difference frequency greater than a predetermined change, said asymmetry of said fields being sufficient so that simultaneous and coordinated approach of two intruders to corresponding points of said boundary on opposite sides of said intermediate point do not produce effects on the frequencies of said oscillations which are sufficiently similar as to prevent production of an alarm signal.

4. The method of electrically protecting a boundary and detecting the approach of an intruder thereto, comprising the steps of generating first and second radio frequency oscillations, radiating a portion of the energy of said first oscillation along said boundary to establish a first electromagnetic field extending along said boundary in one direction from an intermediate point, radiating a portion of the energy of said second oscillation along said boundary to establish a second electromagnetic field extending along said boundary in the other direction from said intermediate point, each of said fields extending outwardly in a direction normal to said boundary from a central plane inclined with respect to a plane extending vertically from said boundary, said central planes from which said fields extend outwardly being inclined in opposite directions with respect to said vertical plane whereby said electromagnetic fields are asymmetric with respect to each other in a direction normal to said boundary but are substantially balanced in a direction parallel to said boundary, varying the frequency of either of said oscillations in response to the entry of an intruder into the corresponding one of said electromagnetic fields, and producing an alarm signal in response to at least a minimum variation in the ratio between the frequencies of said oscillations, said asymmetry of said fields being sufficient so that simultaneous and coordinated approach of two intruders to corresponding points of said boundary on opposite sides of said intermediate point do not produce effects on the frequencies of said oscillations which are sufficiently similar as to prevent production of an alarm signal.

5. The method set forth in claim 4 in which said inclinations of said fields lie in the range of about 15° to 25° from the vertical.

6. The method of electrically protecting a boundary and detecting the approach of an intruder thereto, comprising the steps of generating first and second radio frequency oscillations, radiating a portion of the energy of said first oscillation along said boundary to establish a first electromagnetic field extending along said boundary in one direction from an intermediate point, radiating a portion of the energy of said second oscillation along said boundary to establish a second electromagnetic field extending along said boundary in the other direction from said intermediate point, the center of propagation of at least a portion of each of said fields throughout the axial extent thereof being displaced in respectively opposite directions normal to said boundary whereby said electromagnetic fields are asymmetric with respect to each other in a direction normal to said boundary but are substantially balanced in a direction parallel to said boundary, varying the frequency of either of said oscillations in response to the entry of an intruder into the corresponding one of said electromagnetic fields, and producing an alarm signal in response to at least a minimum variation in the ratio between the frequencies of said oscillations, said asymmetry of said fields being sufficient so that simultaneous and coordinated approach of two intruders to corresponding points of said boundary on opposite sides of said intermediate point do not produce effects on the frequencies of said oscillations which are sufficiently similar as to present production of an alarm signal.

7. In an intruder alarm system for providing an alarm signal indication of the approach of an intruder to a boundary of an area to be protected and having first and second radio frequency oscillators, a first antenna array disposed along said boundary in one direction from an intermediate point and being coupled to one of said oscillators as a frequency determining element therefor, and a second antenna array disposed along said boundary in the other direction from said intermediate point and being coupled to the other of said oscillators as a frequency determining element therefor, each of said antenna arrays comprising a plurality of corresponding vertically spaced wires disposed along said boundary and generally parallel to each other and to the ground along said boundary, the horizontal location relative to said boundary of at least one of the wires of one of said arrays being substantially different from the horizontal location relative to said boundary of a corresponding wire of the other of said arrays whereby the electromagnetic field about one antenna array is asymmetric with respect to the electromagnetic field about the other antenna array in a direction normal to said boundary, said arrays being arranged along said boundary so that said fields are substantially balanced in a direction parallel to said boundary.

8. In an intruder alarm system for providing an alarm signal indication of the approach of an intruder to a boundary of an area to be protected and having first and second radio frequency oscillators tuned to respectively different frequencies, a first antenna array disposed along said boundary in one direction from an intermediate point and being coupled to one of said oscillators as a frequency determining element therefor, and a second antenna array disposed along said boundary in the other direction from said intermediate point and being coupled to the other of said oscillators as a frequency determining element therefor, each of said antenna arrays comprising a plurality of vertically spaced elongated conductors disposed along said boundary and generally parallel to each other and to the ground along said boundary, at least one of the conductors in each of said arrays having a horizontal spacing with respect to other conductors of the corresponding array and with respect to said boundary, said horizontal spacing being oppositely directed with respect to said boundary for one of said arrays with respect to the other of said arrays whereby the electromagnetic field about one antenna array is asymmetric with respect to the electromagnetic field about the other antenna array in a direction normal to said boundary, said horizontal spacings being sufficiently great as to produce sufficient asymmetry that coordinated and simultaneous approach of two intruders to corresponding points of said boundary on opposite sides of said intermediate point do not produce substantially balancing effects on the frequencies of said oscillators, said arrays being arranged along said boundaries so that said fields are substantially balanced in a direction parallel to said boundary.

9. In an intruder alarm system for providing an alarm signal indication of the approach of an intruder to a boundary of an area to be protected and having first and second radio frequency oscillators, a first antenna array disposed along said boundary in one direction from an intermediate point and being coupled to one of said oscillators as a frequency determining element therefor, and a second antenna array disposed along said boundary in the other direction from said intermediate point and being coupled to the other of said oscillators as a frequency determining element therefor, each of said antenna arrays comprising a plurality of vertically and horizontally spaced elongated conductors disposed along said boundary and generally parallel to each other and to the ground along said boundary, the conductors in one of said arrays lying generally in a plane inclined with respect to a plane extending vertically from said boundary and the conductors in the other of said arrays lying generally in a plane inclined in the opposite direction with respect to said plane extending vertically from said boundary whereby the electromagnetic field about one antenna array is asymmetric with respect to the electromagnetic field about the other antenna array in said direction normal to said boundary, said arrays being arranged along said boundary so that said fields are substantially balanced in a direction parallel to said boundary.

10. In an intruder alarm system for providing an alarm signal indication of the approach of an intruder to a boundary of an area to be protected and having first and second radio frequency oscillators tuned to respectively different frequencies, a first antenna array disposed along said boundary in one direction from an intermediate point and being coupled to one of said oscillators as a frequency determining element therefor, and a second antenna array disposed along said boundary in the other direction from said intermediate point and being coupled to the other of said oscillators as a frequency determining element therefor, each of said antenna arrays comprising a plurality of vertically and horizontally spaced wires disposed along said boundary and generally parallel to each other and to the ground along said boundary, the wires in one of said arrays lying generally in a plane inclined with respect to a plane extending vertically from said boundary, the wires in the other of said arrays lying generally in a plane inclined in the opposite direction with respect to said plane extending vertically from said boundary, the angle between each of said inclined planes and said vertical plane lying in the range of about 15° to 25° whereby the electromagnetic field about one antenna array is asymmetric with respect to the electromagnetic field about the other antenna array in said direction normal to said boundary, said arrays being arranged along said boundary so that said fields are substantially balanced in a direction parallel to said boundary.

11. Apparatus as set forth in claim 10 in which said angles are each equal to approximately 20°.

12. An intruder alarm system for providing an alarm signal indication of the approach of an intruder to a boundary of an area to be protected, comprising a first antenna disposed along said boundary in one direction from an intermediate point and a second antenna disposed along said boundary in the other direction from said intermediate point, each of said antennas comprising a plurality of corresponding vertically spaced wires disposed along said boundary and generally parallel to each other and to the ground along said boundary, at least some of the wires forming one of said antennas having a disposition with respect to said boundary considered in a direction transverse to said boundary substantially different from the disposition of the corresponding wires of the other antenna with respect to said boundary considered in said direction transverse to said boundary whereby said antennas exhibit fields which are asymmetric in said direction transverse to said boundary when supplied with electromagnetic energy, a first radio frequency oscillator having said first antenna coupled thereto as a frequency determining element, a second radio frequency oscillator having said second antenna coupled thereto as a frequency determining element, means to mix a portion of the oscillatory energy from said oscillators, and means coupled to said mixing means and responsive to changes in the ratio between the frequencies of said oscillators greater than a predetermined change to produce an alarm signal indication, said fields being substantially balanced in a direction parallel to said boundary.

13. An intruder alarm system for providing an alarm signal indication of the approach of an intruder to a boundary of an area to be protected, comprising a first antenna disposed along said boundary in one direction from an intermediate point and a second antenna disposed along said boundary in the other direction from said intermediate point, each of said antennas comprising a plurality of corresponding vertically spaced wires disposed along said boundary and generally parallel to each other and to the ground along said boundary, at least some of the wires forming one of said antennas having a disposition with respect to said boundary considered in a direction transverse to said boundary substantially different from the disposition of the corresponding wires of the other antenna with respect to said boundary considered in said direction transverse to said boundary whereby said antennas exhibit fields which are asymmetric in said direction transverse to said boundary when supplied with electromagnetic energy, said fields being substantially balanced in a direction parallel to said boundary, a first radio frequency oscillator having said first antenna coupled thereto as a frequency determining element, a second radio frequency oscillator tuned to a different frequency than said first oscillator and having said second antenna coupled thereto as a frequency determining element, means to mix a portion of the oscillatory energy from said oscillators and to suppress frequency components in the resultant signal above the difference beat frequency, means to produce from said signal a first direct voltage whose magnitude varies in proportion to said difference frequency, means to produce a second direct voltage whose magnitude varies in proportion to the magnitude of said signal, alarm signal indication producing means, means responsive to changes in said first direct voltage greater than a predetermined change to operate said alarm signal indication producing means, and means responsive to a drop in said second direct voltage below a predetermined value to operate said alarm signal indication producing means.

14. An intruder alarm system for providing an alarm signal indication of the approach of an intruder to a boundary of an area to be protected, comprising a first antenna disposed along said boundary in one direction from an intermediate point and a second antenna disposed along said boundary in the other direction from said intermediate point, each of said antennas comprising a plurality of vertically and horizontally spaced wires disposed along said boundary and generally parallel to each other and to the ground along said boundary, the wires in one of said antennas lying generally in a plane inclined with respect to a plane extending vertically from said boundary and the wires in the other of said antennas lying generally in a plane inclined in the opposite direction with respect to said plane extending vertically from said boundary whereby said antennas exhibit fields which are asymmetric in a direction transverse to said boundary when supplied with electromagnetic energy, said fields being substantially balanced in a direction parallel to said boundary, a first radio frequency oscillator having said first antenna coupled thereto as a frequency determining element, a second radio frequency oscillator tuned to a different frequency than said first oscillator and having said second antenna coupled thereto as a frequency determining element, means to mix a portion of the oscillatory energy from said oscillators and to suppress frequency components in the resultant signal above the difference beat frequency, means to produce from said signal a direct voltage whose magnitude varies in proportion to said difference frequency, alarm signal indication producing means, and means responsive to changes in said direct voltage greater than a predetermined change to operate said alarm signal indication producing means.

15. An intruder alarm system for providing an alarm signal indication of the approach of an intruder to a boundary of an area to be protected, comprising a first antenna disposed along said boundary in one direction from an intermediate point and a second antenna disposed along said boundary in the other direction from said intermediate point, each of said antennas comprising a plurality of vertically spaced wires disposed along said boundary and generally parallel to each other and to the ground along said boundary, the wires forming one of said antennas having a disposition with respect to each other in a direction transverse to said boundary substantially different from the disposition of the wires of the other antenna with respect to each other in said direction transverse to said boundary whereby said antennas exhibit asymmetric fields when supplied with electromagnetic energy, a first radio frequency oscillator having said first antenna coupled thereto as a frequency determining element, a second radio frequency oscillator tuned to a different frequency than said first oscillator and having said second antenna coupled thereto as a frequency determining element, a mixing circuit, means to supply oscillatory energy from said first and second radio frequency oscillators to said mixing circuit to produce a beat frequency signal, a filter circuit coupled to said mixing circuit to suppress frequency components in said signal other than a selected beat frequency, a frequency discriminator circuit having an input coupled to said filter and arranged to produce a first direct voltage whose magnitude is proportional to the frequency of said filtered signal, a rectifier circuit coupled to said filter and arranged to produce a second direct voltage whose magnitude is proportional to the magnitude of said signal, a multi-stage D.C. amplifier, current responsive means coupled to the output of said D.C. amplifier and arranged to produce an alarm signal indication when the output current of said D.C. amplifier is outside a predetermined range, first delay means having a first relatively short time constant intercoupling the output of said discriminator and the input of said D.C. amplifier and arranged to apply a first input potential proportional to changes in said first direct voltage to the input of said D.C. amplifier whereby changes in said first direct voltage produce corresponding changes in the output current of said D.C. amplifier, and second delay means having a second relatively long time constant intercoupling the output of said rectifier circuit and the input of said D.C. amplifier whereby said second direct voltage is applied as a second input potential to the input of said D.C. amplifier, said second delay means being arranged relative to said D.C. amplifier so that a decrease in said second direct voltage below a predetermined value will cause a decrease in the output current of said D.C. amplifier sufficient to operate said current responsive means.

16. An intruder alarm system for providing an alarm signal indication of the approach of an intruder to a boundary of an area to be protected, comprising a first antenna disposed along said boundary in one direction from an intermediate point and a second antenna disposed along said boundary in the other direction from said intermediate point, each of said antennas comprising a plurality of vertically spaced wires disposed along said boundary and generally parallel to each other and to the ground along said boundary, the wires forming one of said antennas having a disposition with respect to each other in a direction transverse to said boundary substantially different from the disposition of the wires of the other antenna with respect to each other in said direction transverse to said boundary whereby said antennas exhibit asymmetric fields when supplied with electromagnetic energy, a first radio frequency oscillator having said first antenna coupled thereto as a frequency determining element, a second radio frequency oscillator tuned to a different frequency than said first oscillator and having said second antenna coupled thereto as a frequency determining element, a mixing circuit, means to supply oscillatory energy from said first and second radio frequency oscillators to said mixing circuit to produce a beat frequency signal, a low pass filter circuit coupled to said mixing circuit to suppress frequency components in said signal other than the difference frequency, a frequency discriminator circuit having an input coupled to said filter and arranged to produce a first direct voltage whose magnitude is proportional to the frequency of said filtered signal, a rectifier circuit coupled to said filter and arranged to produce a second direct voltage whose magnitude is proportional to the magnitude of said signal, a multi-stage D.C. amplifier, current responsive means coupled to the output of said D.C. amplifier and arranged to produce an alarm signal indication when the output current of said D.C. amplifier is outside a predetermined range, first delay means having a first relatively short time constant intercoupling the output of said discriminator and the input of said D.C. amplifier and arranged to apply a first input potential proportional to changes in said first direct voltage to the input of said D.C. amplifier whereby changes in said first direct voltage produce corresponding changes in the output current of said D.C. amplifier, second delay means having a second relatively long time constant intercoupling the output of said rectifier circuit and the input of said D.C. amplifier whereby said second direct voltage is applied as a second input potential to the input of said D.C. amplifier, and third delay means having a third time constant intermediate said first and second time constants and intercoupling the output and inputs of said D.C. amplifier in negative feedback relationship thereby to apply a third input potential to the input of said D.C. amplifier, said second delay means being arranged relative to said D.C. amplifier so that a decrease in said second direct voltage below a predetermined value will cause a decrease in the output current of said D.C. amplifier sufficient to operate said current responsive means.

17. An intruder alarm system for providing an alarm signal indication of the approach of an intruder to a boundary of an area to be protected, comprising a first antenna disposed along said boundary in one direction from an intermediate point and a second antenna disposed along said boundary in the other direction from said intermediate point, each of said antennas comprising a plurality of vertically and horizontally spaced wires disposed along said boundary and generally parallel to each other and to the ground along said boundary, the wires forming one of said antennas lying generally in a plane inclined with respect to a plane extending vertically from said boundary and the wires forming the other of said antennas lying generally in a plane inlined in the opposite direction with respect to said plane extending vertically from said boundary, the angles between said inclined planes and said vertical plane each lying in the range of about 15° to 25° whereby said antennas exhibit asymmetric fields when supplied with electromagnetic energy, a first radio frequency oscillator having said first antenna coupled thereto as a frequency determining element, a second radio frequency oscillator tuned to a different frequency than said first oscillator and having said second antenna coupled thereto as a frequency determining element, a mixing circuit, means to supply oscillatory energy from said first and second radio frequency oscillators to said mixing circuit to produce a beat frequency signal, a low pass filter circuit coupled to said mixing circuit to suppress frequency components in said signal other than the difference frequency, a frequency discriminator circuit having an input coupled to said filter and arranged to produce a first direct voltage whose magnitude is proportional to the frequency of said filtered signal, a rectifier circuit coupled to said filter and arranged to produce a second direct voltage whose magnitude is proportional to the magnitude of said signal, a multi-stage D.C. amplifier, current responsive means coupled to the output of said D.C. amplifier and arranged to produce an alarm signal indication when the output current of said D.C. amplifier is outside a predetermined range, first delay means having a first relatively short time constant intercoupling the output of said discriminator and the input of said D.C. amplifier and arranged to apply a first input potential proportional to changes in said first direct voltage to the input of said D.C. amplifier whereby changes in said first direct voltage produce corresponding changes in the output current of said D.C. amplifier, and second delay means having a second relatively long time constant intercoupling the output of said rectifier circuit and the input of said D.C. amplifier whereby said second direct voltage is applied as a second input potential to the input of said D.C. amplifier, said second delay means being constructed and arranged so that a decrease in said second direct voltage below a predetermined value will cause a decrease in the output current of said D.C. amplifier sufficient to operate said current responsive means.

18. An electric protection system, comprising electronic protection apparatus for detecting the magnitude of a predetermined protection condition and for producing a first direct voltage whose magnitude varies in proportion to the magnitude of said protection condition, said electronic protection apparatus including means to produce a second direct voltage whose magnitude falls below a predetermined value upon failure of said electronic apparatus, said last mentioned means including a rectifier circuit, a multi-stage D.C. amplifier, current responsive means coupled to the output of said D.C. amplifier and arranged to produce an alarm signal indication when the output current of said D.C. amplifier is outside a predetermined range, first delay means having a first relatively short time constant intercoupling said electronic apparatus and the input of said D.C. amplifier and arranged to apply a first potential proportional to changes in said first direct voltage to the input of said D.C. amplifier whereby changes in said first direct voltage produce corresponding changes in the output current of said D.C. amplifier, and second delay means having a second relatively long time constant intercoupling the output of said rectifier circuit and the input of said D.C. amplifier whereby said second direct voltage is supplied as a second input potential to the input of said D.C. amplifier, said second delay means being arranged so that a decrease in said second direct voltage below a predetermined value will cause a decrease in the output current of said D.C. amplifier sufficient to operate said current responsive means.

19. An electric protection system as set forth in claim 18 in which said first time constant is less than about 4 seconds and said second time constant is of the order of 450 seconds.

References Cited by the Examiner

UNITED STATES PATENTS

| | | | |
|---|---|---|---|
| 2,112,826 | 4/1938 | Cook | 340—258 |
| 2,421,771 | 6/1947 | Browning | 340—258 |
| 2,424,677 | 7/1947 | Brownlee | 340—258 |
| 2,428,290 | 9/1947 | Peck | 340—258 |
| 2,455,376 | 12/1948 | Linday | 340—258 |

FOREIGN PATENTS 699,853   11/1953   Great Britain.

OTHER REFERENCES

Atlee: Electronic Protection for War Plants, Electronics, vol. 24, No. 8, pp. 96–101, August 1951. (Note: FIG. 1 on p. 99.)

NEIL C. READ, *Primary Examiner.*

BENNETT G. MILLER, *Examiner.*

UNITED STATES PATENT OFFICE
CERTIFICATE OF CORRECTION

Patent No. 3,230,518 January 18, 1966

Theo N. Vassil et al.

It is hereby certified that error appears in the above numbered patent requiring correction and that the said Letters Patent should read as corrected below.

Column 5, line 21, for "derivatives" read -- derivative --; column 9, line 52, for "an da" read -- and a --; column 14, line 10, strike out "shape"; line 67, for "asymmetry" read -- asymmetric --; column 16, line 17, for "present" read -- prevent --; column 20, line 39, for "inputs" read -- input --.

Signed and sealed this 6th day of December 1966.

(SEAL)
Attest:

ERNEST W. SWIDER
Attesting Officer

EDWARD J. BRENNER
Commissioner of Patents